April 3, 1928.
B. MEYERING
1,664,893
JOINT
Filed Feb. 20, 1926
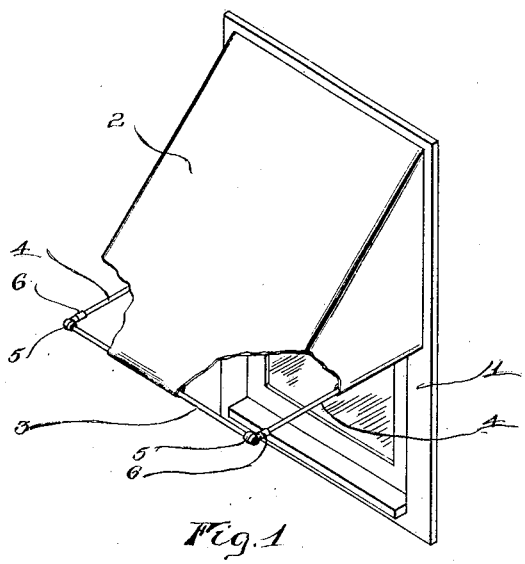
Fig. 1
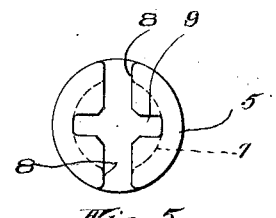
Fig. 5
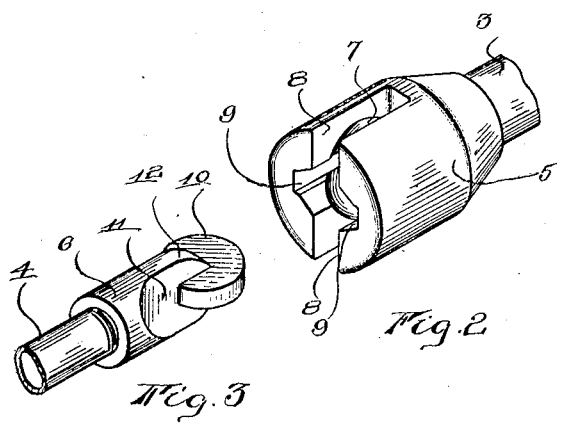
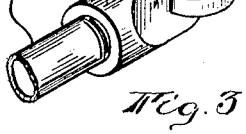
Fig. 3
Fig. 2
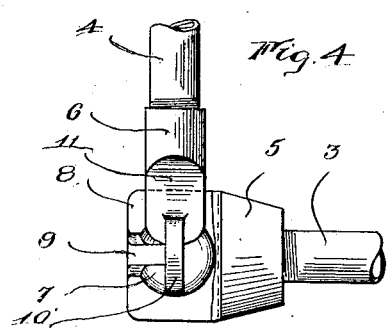
Fig. 4
INVENTOR
Bernard Meyering,
BY
Davis & Simms
his ATTORNEYS.

Patented Apr. 3, 1928.

1,664,893

UNITED STATES PATENT OFFICE.

BERNARD MEYERING, OF ROCHESTER, NEW YORK.

JOINT.

Application filed February 20, 1926. Serial No. 89,792.

The present invention relates to joints, and an object of the invention is to provide a joint in which, when the two members of the joint are arranged at right angles to each other, an effective interlocking connection is provided, and, when moved into alignment, ready separation is permitted.

To these and other ends, the invention consists of certain parts and combinations of parts, all of which will be hereinafter described: the novel features being pointed out in the appended claims.

In the drawings:

Fig. 1 is a perspective view of an awning mounted on a window and employing the frame and the joint of this invention;

Fig. 2 is a perspective view of one of the members of the joint;

Fig. 3 is a perspective view of another member of the joint;

Fig. 4 is a view partially in section of two members in interlocking connection; and Fig. 5 is an end view of the joint member, illustrated in Fig. 2.

Referring more particularly to the embodiment of the invention herein illustrated, 1 indicates a window frame and 2 an awning which employs a frame embodying a connecting bar 3 and side or reach bars 4.

The side or reach bars 4 connect with the connecting bar 3 by joints, each comprising, in this instance, a member 5 and a member 6, each of which has screw threaded connection respectively with the side or reach bars 4 and the connecting bar 3. The member 5, in this instance, has a spherical socket 7 which is intersected by a slot having parallel walls 8, said slot extending from the end of the member inwardly to a point beyond the innermost portion of the spherical socket 7 and also from one side of the member to the other. The member 5 also has the walls 8 of its socket formed with recesses 9 which extend inwardly from the end of the member to the socket 7, and the distance between the two bottom walls of these recesses is substantially equal to the diameter of the spherical socket 7. The other member 6 of the joint has a flattened cylindrical extension 10 which has flat sides and connects with the main body portion of the member by a reduced portion 11. This reduced portion has flattened sides extending transversely of the plane of the cylindrical extension 10 and projects at 12 onto the sides of the central portion or extension 10.

In fitting the two members of the joint together, the members are arranged in alignment and are moved so that the circular portion 10 will pass into notches 9 and into the spherical socket 7. Thereafter, the members are swung laterally one relatively to the other so that the reduced portion 11 passes into the slot at one side of the spherical socket as illustrated in Fig. 4 of the drawing. When in this position, the flattened surfaces of the reduced portion cooperate with the walls 8 of the slot and hold the two members against relative twisting. At the same time the enlarged circular extension 10 prevents the separation of the members. The projections 12 give an extended bearing surface between the member 6 and the walls of the slots 8, so that twisting between the parts in the positions shown in Fig. 4 is prevented. By having the slot extending from one side to the other, the two members may be turned to extend at angles to each other in either direction. After the awning is placed upon the frame and the ends of the reach bars 2 are secured, any disconnection of the joints is prevented because the portions 12 on one joint will cooperate with the bottom wall of the slot formed by the walls 8 and prevent the joint at the opposite side from swinging in a direction to disconnect the parts.

What I claim as my invention and desire to secure by Letters Patent is:

1. A joint comprising two members, one of which has a substantially circular projection and flattened portions adjacent one end of the projection and at right angles to the plane of the projection, and a socket member having a substantially spherical socket and a transverse slot communicating with said socket at one end of the socket member, the walls of said slot having notches which lead to the spherical socket, the circular portion of the first mentioned member lying in the spherical socket and the flattened portions lying in the slot.

2. A joint comprising two members, one of which has an enlarged portion and a reduced portion, and the other of which has a socket in which the enlarged portion may turn and a slot communicating with the socket, the portion of the slot at one end of the socket being enlarged to permit the passage of the enlarged portion of the other member when the two members of the joint are aligned, and, when the two members are out of alignment, the reduced portion of one member lies in the narrow portion of the slot of the other member to interlock the members.

BERNARD MEYERING.